United States Patent [19]

Amano et al.

[11] Patent Number: 4,985,524

[45] Date of Patent: Jan. 15, 1991

[54] PROCESS OF POLYMERIZING VINYL CHLORIDE WITH POST-HEATING OF CHARGING PASSAGE

[75] Inventors: Tadashi Amano; Shigehiro Hoshida, both of Hazaki, Japan

[73] Assignee: Shin-Etsu Chemical Co., Ltd., Tokyo, Japan

[21] Appl. No.: 353,766

[22] Filed: May 18, 1989

[30] Foreign Application Priority Data

May 19, 1988 [JP] Japan .................................. 63-123278
Jun. 3, 1988 [JP] Japan .................................. 63-137020

[51] Int. Cl.$^5$ ................................................. C08F 2/20
[52] U.S. Cl. .................................. 526/344.2; 526/72; 526/199; 526/200
[58] Field of Search ...................... 526/199, 200, 344.2

[56] References Cited

U.S. PATENT DOCUMENTS 3,669,946  6/1972  Koyanagi ........................ 526/344.2
4,708,890  11/1987  Shimizu ................................ 526/62

Primary Examiner—Christopher Henderson
Attorney, Agent, or Firm—Oblon, Spivak, McClelland, Maier & Neustadt

[57] ABSTRACT

A process of preparing a vinyl chloride polymer in a polymerization vessel comprising the steps of:

charging a polymerization initiator through a charging passage communicating with the inside of the polymerization vessel, and polymerizing vinyl chloride or a vinyl monomer mixture containing vinyl chloride in an aqueous medium, wherein after said polymerization initiator has been charged into the polymerization vessel, said charging passage is externally heated. This process can prevent scale formation in the charging passage, and produce a vinyl chloride polymer of high quality.

5 Claims, No Drawings

PROCESS OF POLYMERIZING VINYL CHLORIDE WITH POST-HEATING OF CHARGING PASSAGE

BACKGROUND OF THE INVENTION

1. Field of the Invention

This invention relates to a process of preparing a vinyl chloride polymer, and more particularly to a process of preparing vinyl chloride polymer, that can prepare a vinyl chloride polymer of high quality with a high productivity.

2. Description of the Prior Art

In preparing vinyl chloride polymers, it may sometimes occur that, after a polymerization initiator has been fed into a polymerization vessel through charging passage comprising a charging pipe, etc., the polymerization initiator sticks on the inner wall of the charging passage, particularly at a charging port positioned at the end of the charging passage to remain there. The polymerization initiator remaining like this reacts with a monomer during the polymerization, resulting in formation of polymer scale. Since the polymer scale may grow to clog the charging passage, particularly at the charging port, the grown polymer scale must be removed.

As methods of removing the polymerization initiator having stuck and remained in the charging passage and of preventing formation of the polymer scale, proposed are a method in which the charging passage is washed with an organic solvent, a method in which the charging port is closed to block the invasion of the monomer from the inside of the polymerization vessel, etc.

However, in the former method, in which the charging passage is washed with an organic solvent, a large quantity of organic solvent is required for completely removing the polymerization initiator having stuck and remained therein, so that the solvent remains in a manufactured polymer to cause a lowering of quality, and generation of an ill smell when the polymer is molded or formed. Hence, there is a limit on the amount of the organic solvent to be used, and thus the washing can not be thoroughly performed. As the results, the polymerization initiator remains more or less, bringing about the problem that the polymer scale are still formed if the polymerization is carried out for a long period of time. In the latter method, in which the charging port is closed, there has been the problem that the monomer invades into the charging passage from a gap in the closed charging port resulting in the formation of polymer scale.

There has been also proposed a method in which the polymerization initiator is charged as an aqueous emulsion in order to reduce the amount of an organic solvent to be used. This method can make it avoidable that the organic solvent remains in a manufactured polymer, but yet it is difficult to prevent the polymerization initiator from sticking and remaining in the charging passage, and to prevent the scale formation in the charging passage.

SUMMARY OF THE INVENTION

Accordingly, an object of this invention is to provide a process of preparing a vinyl chloride polymer, that makes it possible to effectively prevent the formation of polymer scale with use of no organic solvent but also makes it possible to decrease an organic solvent remaining in the resulting polymer and obtain a manufactured polymer of high quality.

As a means for solving the above problems, this invention provides a process of preparing a vinyl chloride polymer in a polymerization vessel comprising the steps of:

charging a polymerization initiator through a charging passage communicating with the inside of the polymerization vessel, and polymerizing vinyl chloride or a vinyl monomer mixture containing vinyl chloride in an aqueous medium, wherein after said polymerization initiator has been charged into the polymerization vessel, said charging passage is externally heated.

The process of this invention can remove the polymerization initiator sticking and remaining on the charging passage more effectively than the conventional methods and yet without any use of an organic solvent. Hence, the formation of polymer scale can be effectively prevented, requiring no operation for removing polymer scale, and thus enabling preparation of vinyl chloride polymers with a high productivity. Moreover, the amount of the solvent there remaining in the manufactured polymer can be so small that vinyl chloride polymers of high quality can be obtained.

DETAILED DESCRIPTION OF THE PREFERRED EMBODIMENTS OF THE INVENTION

According to the process of this invention, a charging passage used for charging of a polymerization initiator is externally heated. The charging passage is not required to be the one specially prepared for charging the polymerization initiator. For instance, where a charging passage prepared for charging a polymerization medium such as water, has been used for charging a polymerization initiator, this charging passage used must be externally heated.

In the process of this invention, there is no particular limitation on the form of the charging passage to be heated. However, the charging passage usually comprises a pipe connected with the polymerization vessel, and it has a port at its end (herein, called "charging port") which opens in the inside of the polymerization vessel. There is no limitation on the form of the charging port. For example, the charging port may be able to be opened and closed with a valve.

As the method of externally heating the charging passage, a heated fluid such as water vapor, hot water, or heated solvent or oil may be passed through a heating jacket provided on the outer peripheries of the charging passage comprising a charging pipe and charging port, or between an outer pipe and inner pipe of a pipe of double-pipe structure. When the water vapor is used, the water vapor used or generated in other processes in the factory can be utilized as the water vapor to be used.

The charging passage may be heated at the temperature that may cause the decomposition of the polymerization initiator used, and, in usual cases, preferably at not less than 80° C., and more preferably at not less than 100° C. Heating at not less than 100° C. enables rapid decomposition of the polymerization initiator.

In this invention, there are no particular limitations on the polymerization initiator which may be used and it may include those conventionally used in preparing vinyl chloride polymers, as exemplified by percabonate compounds such as diisopropyl peroxydicarbonate, di-2-ethylhexyl peroxydicarbonate, and diethoxyethyl peroxydicarbonate; perester compounds such as t-butyl peroxyneodecanate, t-butyl peroxypivarate, t-hexyl peroxypivarate, and alpha-cumyl peroxyneodecanate; peroxides such as acetylcyclohexylsulfonyl peroxide, 2,4,4-trimethylpentyl-2-peroxyphenoxyacetate, and 3,5,5trimethylhexanoyl peroxide; azo compounds such as azobis-2,4-dimethylvaleronitrile, and azobis(4-methoxy-2,4-dimethylvaleronitrile); potassium persulfate, ammonium persulfate, and hydrogen peroxide. These can be used either alone or in combination.

In this invention, the above polymerization initiator may be charged as it is, or appropriately charged as a solution thereof in an organic solvent such as toluene or isoparaffin, or as an aqueous emulsion prepared using a dispersant, with its viscosity so modified as to be readily charged, but there are no particular limitations. Charging the polymerization initiator as the aqueous emulsion has the advantage that the above stated disadvantages that the organic solvents entail can be obviated. The above dispersant used in preparing the aqueous emulsion may be any of those used in the ordinary suspension polymerization or emulsion polymerization of vinyl chloride, and may include partially polymerized polyvinyl alcohols, cellulose esters, water-soluble starch esters, polyacrylic acid, and polyoxyethylene sorbitan monolaurate. There are no particular limitations on the concentration of the polymerization initiator in the aqueous emulsion and on the viscosity of the aqueous emulsion. However, the polymerization initiator may usually be contained in a concentration of from about 20 to 90% by weight, and the viscosity of the aqueous emulsion may be usually adjusted to 500 cP or less at 25° C. Where the polymerization initiator is charged as a solution in an organic solvent, the concentration of the polymerization initiator is not particularly limited but may be usually about 20 to 90% by weight.

The process of this invention can be applied to polymerization of any conventionally known vinyl chloride or vinyl monomer mixtures containing vinyl chloride. The form of polymerization is also not limited, including, for example, suspension polymerization and emulsion polymerization.

The vinyl monomers other than vinyl chloride may include, for example, alpha-olefins such as ethylene propylene, 1-butene, 1-pentene, 1-hexene, 1-heptene, 1-octene 1-nonene, 1-decene, 1-undecene, 1-dodecene, 1-tridecene and 1-tetradecene, acrylic acid and esters thereof, methacrylic acid and esters thereof, maleic acid and esters thereof, vinyl compounds such as vinyl acetate, vinyl propionate and alkyl vinyl ethers, maleic anhydride, acrylonitrile, styrene, vinylidene chloride, other monomers copolymerizable with vinyl chloride, and mixtures of any of these.

In instances in which a dispersant is used in the present polymerization, there are no particular limitations on the dispersant to be used, and those hitherto commonly used may be used. For example, it may include water-soluble cellulose ethers such as methyl cellulose, hydroxyethyl cellulose, hydroxypropyl cellulose, and hydroxypropylmethyl cellulose; watersoluble starch ethers partially saponified polyvinyl alcohol; acrylic acid polymers such as polyacrylic acid; water-soluble polymers such as gelatin; oil-soluble emulsifying agents such as sorbitan monolaurate, sorbitan trioleate, glycerol tristearate, and ethylene oxide propylene oxide block copolymers; and water-soluble emulsifying agents such as polyoxyethylene sorbitan monolaurate, polyoxyethylene glycerol oleate, and sodium laurate. These can be used either alone or in combination.

Other conditions in the polymerization according to the process of this invention, such as the manner by which the aqueous medium, vinyl chloride or other vinyl monomer, and dispersant are charged in the polymerization vessel, may be in the same manner as conventionally taken, and require no particular limitation. The same applies also to polymerization conditions such as charge proportion for these and polymerization temperature.

It is also optional to further add, if necessary, a polymerization regulator, a chain transfer agent, a pH adjustor, a gelation improver, an antistatic agent, an antiscale agent, etc. which are commonly used in preparing vinyl chloride polymers.

In the practice of the process of this invention, an aqueous medium, monomer, polymerization initiator and other necessary materials are charged into the polymerization vessel. There are no limitations on the order of charging of these materials. The polymerization initiator may be charged at any time, before and/or in the course of polymerization, as required. It may also be charged continuously or intermittently in plural portions. It should be appreciated that, according to the process of this invention, in any cases, the charging of the polymerization initiator must be followed by heating of the charging passage.

In the process of this invention, the polymerization is carried out at a temperature in the range of about 10° to 95° C., depending on the desired polymerization degree of the resulting polymer.

EXAMPLES

This invention will be described below in detail by giving Examples and Comparative Examples.

EXAMPLES 1

In a polymerization vessel made of stainless steel and having an internal volume of 2,000 lit., 980 kg of deionized water, 382 g of partially saponified polyvinyl alcohol and 143 g of water-soluble methyl cellulose were charged, the inside of the polymerization vessel was evacuated, and thereafter 700 kg of vinyl chloride was charged. Next, 280 g of di-2-ethylhexyl peroxydicarbonate was fed into the polymerization vessel with use of a constant rate pump. Thereafter water vapor (130° C.) was passed for three minutes through a heating jacket provided on the outside of the pipe having an internal diameter of 1 cm and a length of 3 m and charging port communicating with the pipe through which the polymerization initiator had flowed, thereby the pipe and charging port being heated to 110° C.

With stirring the content of the polymerization vessel, temperature was raised to 66° C. to initiate polymerization, which was stopped when the inner pressure of the polymerization vessel fell to 6.0 kg/cm$^2$, and the unreacted monomer was recovered, followed by dehydration and drying to obtain a vinyl chloride polymer.

After the polymerization, the charging pipe and charging port for the polymerization initiator were taken apart to observe the sticking of polymer scale on these parts, which was evaluated on the basis of the following criterions, and also the amount of the solvent remaining in the resulting polymer was measured according to the following method. Results obtained are shown in Table 1.

Evaluation method for the sticking of scale
A: No scale stuck.
B: Scale stuck a little.
C: Scale stuck in a large quantity, having clogged the charging port.

Measurement method for the amount of remaining solvents

Into a vial, 5 g of the resulting polymer was put, and heating was carried out at 130° C. for 30 minutes. A gaseous phase portion in the vial was analyzed by gas chromatography to indicate by ppm the amount measured for the remaining solvent.

EXAMPLES 2 and 3

In each Example, the procedure of Example 1 was repeated to carry out polymerization 100 times (Example 2) or 500 times (Example 3), and thereafter the sticking of polymer scale was observed and the amount of the organic solvent remaining in the resulting polymers was measured in the same manner as in Example 1. Results obtained are shown in Table 1.

COMPARATIVE EXAMPLES 1 and 2

The procedure of Example 1 was repeated to carry out polymerization, except that the charging pipe and charging port were not heated, but washed with 300 cc of toluene (Comparative Example 1) or 300 cc of n-hexane (Comparative Example 2). The sticking of polymer scale was observed and the amount of the organic solvent remaining in the resulting polymers was measured in the same manner as in Example 1. Results obtained are shown in Table 1.

COMPARATIVE EXAMPLE 3

The procedure of Example 1 was repeated to carry out polymerization, except that the charging pipe and charge port were not heated, and no washing was carried out. The sticking of polymer scale was observed and the amount of the solvent remaining in the resulting polymers was measured in the same manner as in Example 1. Results obtained are shown in Table 1.

TABLE 1

| | Sticking of scale | Amount of remaining organic solvent(ppm) |
|---|---|---|
| Example: | | |
| 1 | A | ≦1 |
| 2 | A | ≦1 |
| 3 | B | ≦1 |
| Comparative Example: | | |
| 1 | A | 390 |
| 2 | B | 235 |
| 3 | C | ≦1 |

EXAMPLES 4

In a polymerization vessel made of stainless steel and having an internal volume of 2,000 lit., 980 kg of deionized water, 382 g of partially saponified polyvinyl alcohol and 143 g of water-soluble methyl cellulose were charged, the inside of the polymerization vessel was evacuated, and thereafter 700 kg of vinyl chloride was charged. Next, 580 g of an aqueous emulsion containing 50% of di-2-ethylhexyl peroxydicarbonate was fed into the polymerization vessel with use of a constant rate pump, and thereafter water vapor (120° C.) was passed for three minutes through a heating jacket provided on the outside of the pipe having an internal diameter of 1 cm and a length of 3 m and a charging port communicating with the pipe through which the polymerization initiator had flowed, thereby the pipe and charging port being heated to 100° C.

With stirring the content to the polymerization vessel, temperature was raised to 60° C. to initiate polymerization, which was stopped when the inner pressure of the polymerization vessel fell to 6.0 kg/cm², and the unreacted monomer was recovered, followed by dehydration and drying to obtain a vinyl chloride polymer.

After the polymerization, the sticking of polymer scale on the charging pipe and charging port for the polymerization initiator was evaluated, and also the amount of the solvent remaining in the resulting polymer was measured in the same manner as in Example 1. Results obtained are shown in Table 2.

EXAMPLES 5 and 6

In each Example, the procedure of Example 4 was repeated to carry out polymerization 100 times (Example 5) or 500 times (Example 6), and thereafter the sticking of polymer scale was observed and the amount of the organic solvent remaining in the resulting polymers was measured in the same manner as in Example 1. Results obtained are shown in Table 2.

COMPARATIVE EXAMPLES 4 and 5

The procedure of Example 4 was repeated to carry out polymerization, except that the charging pipe and charging port were not heated, but washed with 300 cc of toluene (Comparative Example 4) or 300 cc of n-hexane (Comparative Example 5). The sticking of polymer scale was observed and the amount of the organic solvent remaining in the resulting polymers was measured in the same manner as in Example 1. Results obtained are shown in Table 2.

COMPARATIVE EXAMPLE 6

The procedure of Example 4 was repeated to carry out polymerization, except that the charging pipe and charging port were not heated, and no washing was carried out. The sticking of polymer scale was observed and the amount of the organic solvent remaining in the resulting polymers was measured in the same manner as in Example 1. Results obtained are shown in Table 2.

TABLE 2

| | Sticking of scale | Amount of remaining organic solvent(ppm) |
|---|---|---|
| Example: | | |
| 4 | A | ≦1 |
| 5 | A | ≦1 |
| 6 | B | ≦1 |
| Comparative Example: | | |
| 4 | C | 420 |
| 5 | C | 250 |
| 6 | C | ≦1 |

What we claim is:

1. A process of preparing a vinyl chloride polymer in a polymerization vessel comprising the steps of:
    charging a polymerization initiator through a charging passage communicating with the inside of the polymerization vessel, and
    polymerizing vinyl chloride or a vinyl monomer mixture containing vinyl chloride in an aqueous medium,
    wherein after said polymerization initiator has been charged into the polymerization vessel, said charging passage is externally heated at not less than 80° C.

2. The process as claimed in claim 1, wherein said charging passage comprises a pipe communicating with the inside of the polymerization vessel.

3. The process as claimed in claim 1, wherein said polymerization initiator is charged in the polymerization vessel in the form of an aqueous emulsion.

4. The process as claimed in claim 1, wherein said charging passage is heated at not less than 100° C.

5. The process as claimed in claim 1, wherein said charging passage is heated with a high temperature water vapor.

* * * * *